Dec. 24, 1935.        C. A. CAMPBELL        2,025,154
ENGINEER'S VALVE
Filed May 10, 1934        2 Sheets-Sheet 1

Inventor
Charles A. Campbell
By
Dodge and Sons
Attorneys

Dec. 24, 1935.  C. A. CAMPBELL  2,025,154
ENGINEER'S VALVE
Filed May 10, 1934  2 Sheets-Sheet 2

Inventor
Charles A. Campbell
By Dodge and Son
Attorneys

Patented Dec. 24, 1935

2,025,154

UNITED STATES PATENT OFFICE 2,025,154

ENGINEER'S VALVE

Charles A. Campbell, Watertown, N. Y., assignor to The New York Air Brake Company, a corporation of New Jersey Application May 10, 1934, Serial No. 724,991

29 Claims. (Cl. 303—56)

This invention relates to engineer's brake valves for fluid pressure brakes, and in its more limited aspects is directed to engineer's brake valves of the so-called deadman type.

As usually constructed such valves include the brake valve proper, usually of the rotary type, having several positions, commonly release, lap, service application, and emergency application positions, and a normally closed deadman valve, which when open produces an emergency application, independently of the rotary valve. The rotary valve is positioned by a handle which may be swung about an axis concentric with the axis of the rotary valve to position the latter. This handle is also capable of being shifted in a plane at right angles to the plane in which it normally swings, and when held by the operator in such normal plane, prevents suitable motor means, (usually a spring) from opening the deadman valve. Thus release of the handle automatically produces an emergency application.

The handles of such valves have been removable, but to effect this result recourse has been had to undesirably complicated structures, not particularly well protected against unauthorized manipulation.

One object of the present invention is the production of a simple mechanism of the above class, in which the valve actuating means are completely housed and cannot be manipulated by means other than a precisely fitting handle. Certain features are useful with brake valves of the removable-handle type irrespective of the presence of the deadman feature.

Another feature of the invention is an arrangement in which the removable handle forms the operative connection between the deadman actuating motor means and the deadman valve, so that removal of the handle renders the motor means ineffective to open the deadman valve.

Another feature is an arrangement of parts such that the act of removing and also the act of inserting the handle entail momentary opening of the deadman valve.

Another feature is the provision of a single interchangeable part which defines a single position of the rotary valve in which the handle may be removed or inserted. In some classes of service it is desirable to remove the handle in an application position, say service position, and in other classes of service it is desirable to remove it in some other position, say lap position. By interchanging the part in question, the desired position may readily be defined without entailing other changes in the valve structure.

Other features of invention will be apparent from a consideration of the following detailed description of the preferred embodiment illustrated in the accompanying drawings, in which,—

Fig. 1 is a vertical axial section of the complete valve, showing the position assumed by the parts when the handle is held depressed. The deadman valve therefore is closed. The rotary valve is in the position in which the handle may be withdrawn.

Fig. 6 is a fragmentary perspective view of the handle which when inserted into the valve housing and through the member illustrated in Fig. 5, forms an operating connection between that member, on the one hand, and the rotary valve and the deadman valve, on the other hand.

Fig. 7 is a fragmentary view of the detent which defines the various positions of the rotary valve.

Figure 1:
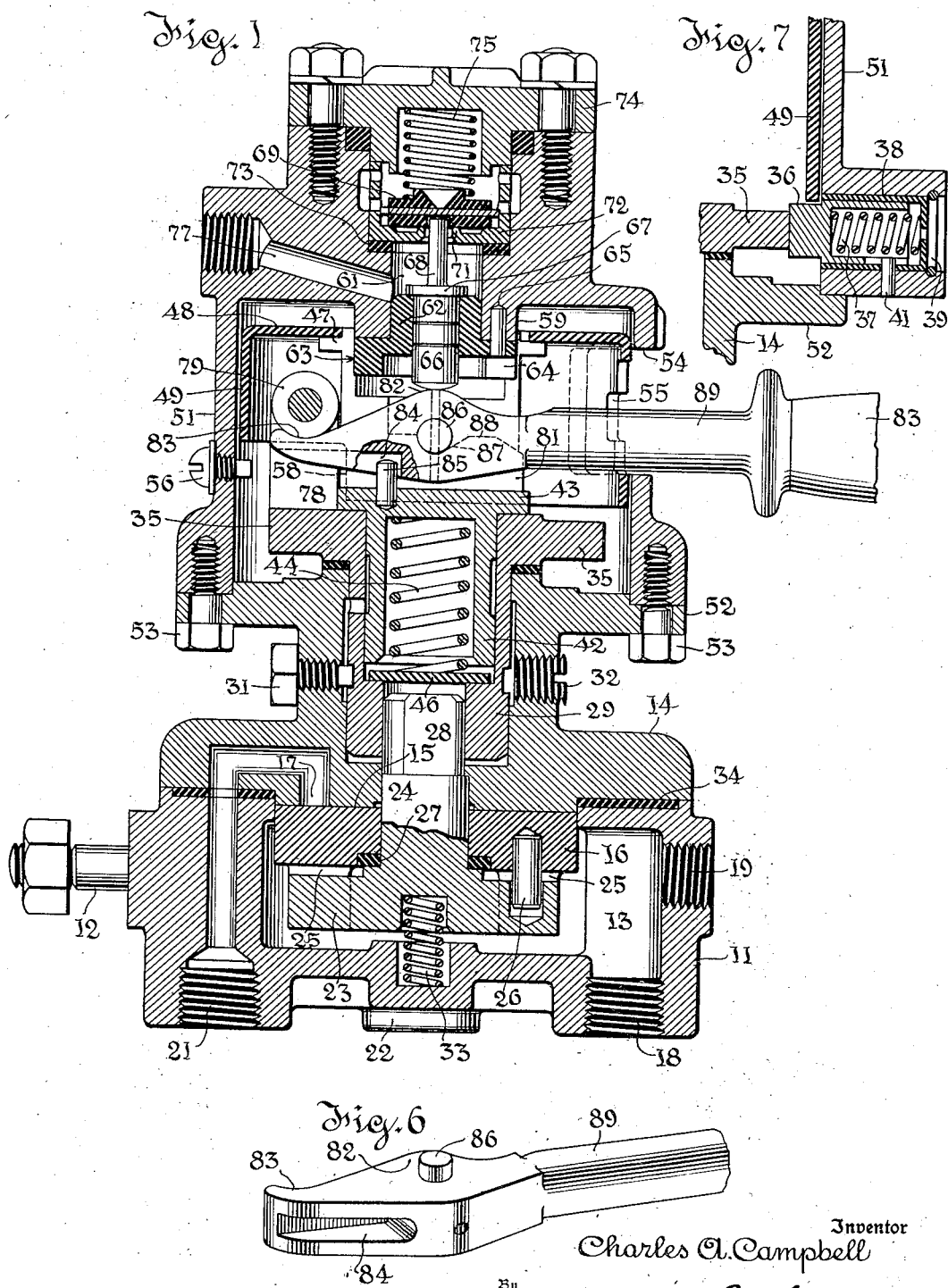

Referring first to Fig. 1, the part 11 represents a pipe bracket having studs 12 by means of which it may be attached to any suitable support. The member 11 encloses a chamber 13 for the rotary valve and this chamber is closed at its upper side by cap 14, which has formed on its lower face the seat 15 for the rotary valve 16. The seat 15 is provided with suitable ports, one of which is indicated at 17, and the valve 16 is suitably ported. The porting of the valve is not illustrated because it will vary with the class of service and is not a feature of the present invention.

The pipe bracket 11 is provided with connections for certain pipes which will vary according to the brake system, but in the example illustrated a main reservoir connection is indicated at 18 and leads to the chamber 13. Another connection 19 might be used to connect a pressure gage for indicating main reservoir pressure. A connection 21 may be used to connect brake pipe or control reservoir and communicates by a passage formed in the bracket 11 and cap 14 with the port 17 in the seat of the rotary valve 16. Another connection is indicated at 22.

The valve 16 is rotated by means of a head 23 on a key or stem 24. The head 23 enters between lugs 25 on the back (lower face) of the rotary valve 16, and an interference pin 26 may be used to preclude improper assembly. A gasket 27 prevents leakage along the stem where it passes through the center of the valve 16. The stem 24 is squared or flattened at its upper end, as indicated at 28, and is thereby connected to a hub member 29 swiveled in the neck of the cap 14 and retained therein by a cap screw 31 whose reduced end works in a groove in the hub, as clearly indicated in the drawings.

A threaded plug 32 closes a lubricating opening. A coiled compression spring 33, reacting between the lower wall of the pipe bracket 11 and the head 23 of the valve actuating key, forces the key upward, thereby exerting sealing pressure on the gasket 27 and pressing the valve 16 to its seat 15. A gasket 34 is interposed between the bracket 11 and the cap 14.

The driving connection at 28 is such as to permit vertical movement of the key 24. The hub 29 has at its upper end a flange 35 notched on its periphery to coact with an impositive detent 36 (see Fig. 7) which is urged into engagement therewith by means of a coiled compression spring 37. The detent 36 is guided in a bushing 38 retained by a snap ring 39. A pin 41 holds the detent against rotation.

Figure 3:
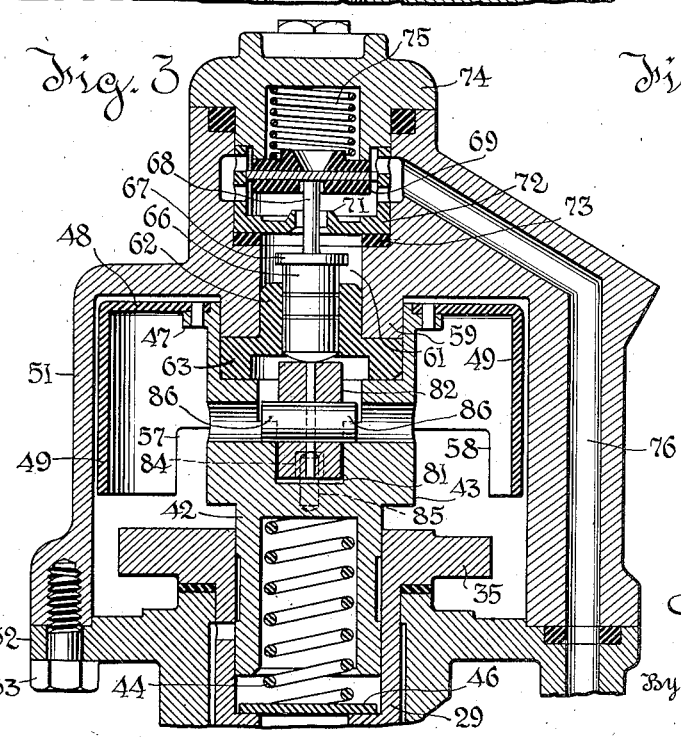
Fig. 3 is a vertical axial section on the line 3—3 of Fig. 2, looking in the direction of the arrows.

The assembly made up of the parts 36 to 41 is out of the planes of section of Figs. 1 and 3. Its exact position is not important, as it is largely a matter of design.

Figure 5:
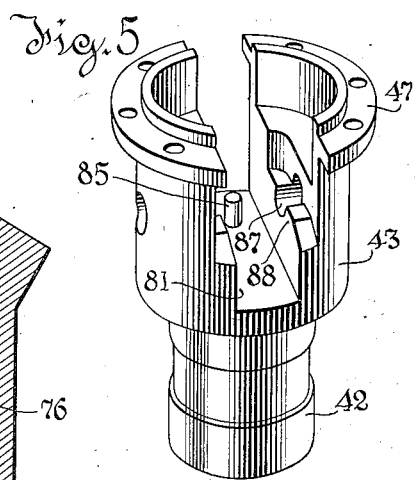
Fig. 5 is a perspective view of a freely rotatable member which centers the handle and when the handle is inserted serves as a fulcrum therefor in its movements in the two planes above specified.

The hub member 29 is counterbored from the top to receive the bearing sleeve member 42 of the handle fulcrum member 43, best shown in Fig. 5. The member 43 is freely rotatable with reference to the hub 29 and is axially movable relatively thereto. It is constantly urged upward by a motor spring 44 housed in a central cavity within the portion 42 and reacting between a thrust plate 46 seated in hub 29, and the upper end of the cavity just mentioned.

The upper end of the member 43 is provided with an outward extending flange 47 and to this flange is connected a combined stop and guard member 48, having a depending peripheral skirt 49. This skirt 49 turns within a cylindrical housing 51 which rests on the flange 52 formed at the upper end of the neck portion of cap 14. The housing 51 is connected to flange 52 by cap screws 53. It is provided on its side with an arcuate aperture, indicated at 54, in Fig. 1, and this aperture is masked by the depending skirt 49, above described. The skirt 49 is provided with a cruciform slot 55, through which the handle member is inserted, as will be described.

Rotary motion of the skirt 49 is limited by a stop screw 56 threaded through the housing 51, the inner end of the screw coacting with the shoulders 57 and 58 forming the ends of a notch in the skirt 49 (see Fig. 3). Collision of the shoulders 57 and 58 with the ends of screw 56 limits the motion of the member 48 so that the slot 55 in the skirt 49 may move from end to end of the opening 54 in housing 51. The upper end of the member 43 is in telescopic relation with the boss 59 concentric with the axis of stem 24. This boss 59 is formed in the housing 51 and is counterbored at 61 to form a flow passage for the deadman valve, hereinafter described.

Pressed into this counterbore is the hub 62 of a flanged bushing 63, the flanged bushing being cut away, as indicated at 64, to form a passage through which the end of the handle moves when the handle is inserted and removed.

A staking pin 65 determines the angular position of the slot 64. By substituting bushing 63 having the staking pin 65 differently located it is possible to fix variably the position of the rotary valve at which the actuating handle may be withdrawn. Instead of interchanging bushings, a plurality of stake holes in boss 59 may be used.

The bushing 63 is provided with a central guideway having a plunger 66 whose downward motion is limited by a peripheral flange 67. The plunger 66 carries at its upper end a stem 68 which when the plunger is forced upward, engages a poppet valve 69 and lifts it from its seat 71. The seat 71 is formed on a bushing 72 inserted in a cavity in the upper end of the housing 51 and is held against a gasket 73 by a cap 74. This cap is attached to the body 51 by cap screws, as shown.

A coiled compression spring 75 reacts between the cap 74 and the valve 69 to urge the valve in a seating direction. The valve 69 controls communication between a passage 76 leading to the space above the seat 71 and a vent passage 77 which may lead to any suitable point of discharge, for example, atmosphere. The port 76 is formed partially in the housing 51 and partially in the cap 14 and bracket 11 and leads to connection 22. It is connected to any suitable mechanism which will produce an emergency application of the brakes if the port 76 is vented. The present invention is not concerned with the particular means for producing an emergency application, and any device operable by the opening and closing of a valve, such as the valve 69, might be used.

Figure 2:
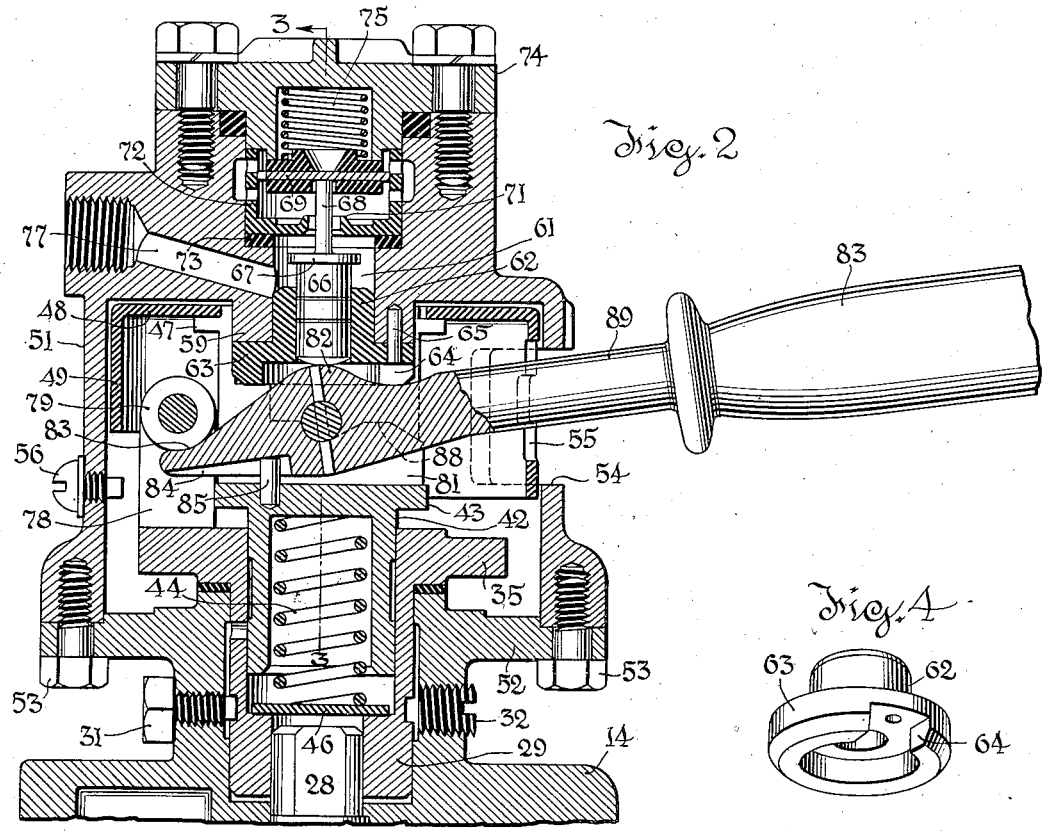
Fig. 2 is a fragmentary view similar to the upper portion of Fig. 1, but showing the position assumed by the parts when the handle is released and the deadman valve is held open. In the position shown the handle may be withdrawn and inserted.
Figure 4:
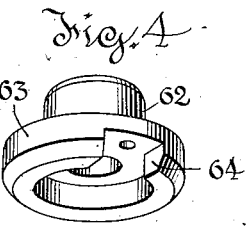
Fig. 4 is a perspective view of the interchangeable part which defines the position in which the handle may be withdrawn.

The hub 29 is provided with two upstanding lugs 78 between which a roller 79 is mounted on a journal pin, as clearly shown in Figs. 1 and 2. The upper end of the member 43 is provided with a transverse slot 81 just wide enough to receive the head 82 of an operating handle, whose grip portion is indicated at 83. The head 82 is provided with a tapered nose slightly concaved on its upper face, as indicated at 83, the radius of curvature approximating that of the roller 79. On the lower side of the nose portion is formed a longitudinal slot 84 which receives an interference pin 85 mounted in the lower portion of the slot 81. When the head 82 is inserted through the slot 81, it clears the interference pin 85, and if the handle is tilted upward to the position shown in Fig. 2, the concave portion 83 of the nose enters beneath the roller 79 and between the lugs 78. The concave portion 83 prevents withdrawal of the handle when in the depressed position of Fig. 1, and permits withdrawal in the raised position of Fig. 2. In performing this function it is assisted by the trunnions 86 which are formed by a pin extending through the head 82 and staked therein, as clearly shown in Fig. 2.

The trunnions 86, when the handle is positioned, turn in sockets 87 formed at the sides of the slot 81 and when the handle is withdrawn these trunnions must ride over the bosses 88 whose form is indicated in Figs. 1 and 5.

The reason for the cruciform shape of the slot 55 will now be understood. The vertical portion of the cruciform slot permits the passage of the head 82 and offers clearance for the vertical swinging movement of the neck 89 which connects the grip 83 with the head 82. The horizontal portions of the cruciform slot offer clearance for the entrance of the trunnions 86.

Assume that the handle is withdrawn. It will be observed that the skirt 49 with its slot 55 are exposed by the opening 54 and may be freely turned through the limits of motion permitted by the stop screw 56 without affecting either the deadman valve or the rotary valve. The slot 55 remains alined, however, with the slot 81 so that the head 82 of the handle is readily introduced. It can not, however, be pushed clear through the slot 81 until brought into alinement with the interval between the lugs 78 and to do this the handle 83 must be in its raised position.

As the handle is forced home the trunnions 86 rise over the bosses 88 so that the head 82 engages the stem 66 and forces this up, unseating the valve 69. Since the concave nose 83 has entered beneath the roller 79 and the trunnions 86 have entered the seats 87, the handle 83 may be depressed. In this motion it swings around the journal of roller 79 as a fulcrum, and forces the member 43 to its lowermost position in which the head 82 permits stem 66 to move downward far enough to permit valve 69 to close. Insertion of the handle locks the hub 29 and the member 43 together so that they turn as a unit in operating the rotary valve 16. If the handle 83 be released it will be forced upward by the spring 44, and engaging plunger 66, will move the plunger up unseating valve 69 and produce emergency application.

To withdraw the handle it is necessary to turn the rotary valve to the position defined by the slot 64 and move the handle 83 to the upper position shown in Fig. 2. It can not be withdrawn unless these requirements are met. Consequently, withdrawal of the handle insures, first, that the rotary valve is left in the desired position, and, second, that as an incident to withdrawal, the deadman valve 68 is unseated to produce an emergency application. The deadman valve is similarly unseated to produce such an application when the handle is inserted. Where, as is common practice in the art, a foot-actuated deadman valve (not shown) is connected in series with the valve 69, the emergency application can be avoided by holding the foot-actuated valve closed while removing or inserting the handle.

The skirt 49, by blanking the larger opening 54 except for the cruciform slot, affords a very restricted opening through which the valve actuating handle must be inserted. The member 43 offers the only means to position the handle positively and produce a satisfactory locking engagement between the member 43 and the hub 29. The interference pin 85 and the concavity of the nose 83, afford further means for precluding the successful insertion of a bar to operate the rotary valve. The fact that the head 82 forms the operative connection between the member 43 and the plunger 66, renders the deadman valve completely inoperative by the motor spring 44 when the handle is withdrawn.

These various features individually contribute desirable results and in the combination produce an engineer's brake valve of the deadman type which is simple to construct, certain to function, and adequately protected against tampering.

The use of the interchangeable bushing 63 permits easy modification of the characteristics of the mechanism as to position in which the handle is withdrawn. By interchanging cap member 14 and rotary valve 16 any desired porting for the rotary valve and its seat can be secured, without requiring changes in the related mechanism.

The particular embodiment shown has been used with a straight air system of the two-pipe relay type, and has demonstrated its desirable characteristics in actual service under peculiarly severe operating conditions.

What is claimed is:—

1. In a brake valve, the combination of a valve; a rotary member for actuating said valve, said member having an eccentric lug; an apertured member swiveled coaxially with respect to said rotary member; and a removable handle insertible through the aperture in said swiveled member into driving engagement with said lug.

2. In a brake valve, the combination of a valve; a rotary member for actuating said valve, said member having an eccentric lug; an apertured member swiveled coaxially with respect to said rotary member; a removable handle insertible through the aperture in said swiveled member into driving engagement with said lug; and a cap enclosing both members and having an aperture for permitting the insertion and operative movements of said handle.

3. In a brake valve, the combination of a valve; a rotary member for actuating said valve, said member having an eccentric lug; an apertured member swiveled coaxially with respect to said rotary member; a removable handle insertible through the aperture in said swiveled member into driving engagement with said lug; a cap enclosing both said members and having an aperture for permitting the insertion and operative movements of said handle; and a guard carried by said swiveled member, said guard masking the aperture in said cap and having an aperture dimensioned to permit insertion of said handle.

4. In a brake valve, the combination of a valve; a rotary hub for actuating said valve, said hub having an eccentric lug to receive a driving handle; a transversely slotted member swiveled concentrically in said hub; a removable handle insertible through the slot in said swiveled member into engagement with said lug; and interfering means in said slot serving to impose limitations on the form of the insertible handle.

5. In a brake valve, the combination of a valve; a rotary hub for actuating said valve, said hub having an eccentric lug to receive a driving handle; a transversely slotted member swiveled concentrically in said hub; a removable handle insertible through the slot in said swiveled member into engagement with said lug; interfering means in said slot serving to impose limitations on the form of the insertible handle; and a cap enclosing said hub and swiveled member, and having a slot for permitting the insertion and operative movements of said handle.

6. In a brake valve, the combination of a valve; a rotary hub for actuating said valve, said hub having an eccentric lug to receive a driving handle; a transversely slotted member swiveled concentrically in said hub; a removable handle insertible through the slot in said swiveled member into engagement with said lug; interfering means in said slot serving to impose limitations on the form of the insertible handle; a cap enclosing said hub and swiveled member, and having a slot for permitting the insertion and operative movements of said handle; and a guard carried by said swiveled member, said guard masking said slot and having a slot dimensioned to permit insertion of said handle.

7. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; and a deadman valve having actuating means in the path of said handle when so tilted, whereby the handle serves as an operating connection between said yielding means and said deadman valve.

8. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; and a cap enclosing said hub, slotted member and deadman valve, said cap having an aperture for the insertion and operating movements of said handle.

9. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operative movements of said handle; and a guard carried by said slotted member and masking the aperture in said cap, said guard having a slot for the insertion and tilting movements of said handle.

10. The combination of a valve, a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operative movements of said handle; and means preventing withdrawal and insertion of said handle except in one angular position of said hub.

11. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operative movements of said handle; a guard carried by said slotted member and masking the aperture in said cap, said guard having a slot for the insertion and tilting movements of said handle; and means preventing withdrawal and insertion of said handle except in one angular position of said hub.

12. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operating movements of said handle; and means capable of assembly with said cap in different angular relation with respect thereto, to define a single position of said hub in which said handle may be inserted and withdrawn.

13. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operative movements of said handle; a guard carried by said slotted member and masking the aperture in said cap, said guard having a slot for the insertion and tilting movements of said handle; and means capable of assembly with said cap in different angular relation with respect thereto, to define a single position of said hub in which said handle may be inserted and withdrawn.

14. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operating movements of said handle; and means preventing withdrawal of said handle except when tilted to actuate said deadman valve.

15. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operative movements of said handle; a guard carried by said slotted member and masking the aperture in said cap, said guard having a slot for the insertion and tilting movements of said handle; and means preventing withdrawal of said handle except when tilted to actuate said deadman valve.

16. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operating movements of said handle; and means precluding withdrawal of said handle except in one angular position of said hub, and until said handle has been tilted to actuate said deadman valve.

17. The combination of a valve; a rotary hub for actuating said valve, said hub having an eccentric lug to receive an actuating handle; a slotted member swiveled concentrically in said hub and shiftable axially therein; yielding means urging said swiveled member axially relatively to said hub; a removable handle insertible through the slot in said member into driving engagement with said lug to rotate said hub, said handle being tiltable about said lug as a fulcrum by the axial movement of said swiveled member; a deadman valve having actuating means in the path of said handle when so tilted, whereby the handle serves as an operating connection between said yielding means and said deadman valve; a cap enclosing said hub, slotted member and deadman valve, said cap having an aperture for the insertion and operative movements of said handle; a guard carried by said slotted member and masking the aperture in said cap, said guard having a slot for the insertion and tilting movements of said handle; and means precluding withdrawal of said handle except in one angular position of said hub, and until said handle has been tilted to actuate said deadman valve.

18. The combination of a valve; a rotary hub for actuating said valve, said hub having an eccentric lug to receive an actuating handle; a slotted member swiveled concentrically in said hub and shiftable axially therein, said slot being formed with at least one bearing notch and adjacent cam shoulder; yielding means urging said swiveled member axially relatively to said hub; a removable handle insertible through the slot in said member into driving engagement with said lug, said handle having at least one journal which rides over said cam shoulder to seat in said bearing notch as the handle is inserted, said lug and journal serving as fulcra for the handle in tilting motions; and a deadman valve in the path of said handle when so tilted.

19. The combination of a valve; a rotary hub for actuating said valve, said hub having an eccentric lug to receive an actuating handle; a slotted member swiveled concentrically in said hub and shiftable axially therein, said slot being formed with at least one bearing notch and adjacent cam shoulder; yielding means urging said swiveled member axially relatively to said hub; a removable handle insertable through the slot in said member into driving engagement with said lug, said handle having at least one journal which rides over said cam shoulder to seat in said bearing notch as the handle is inserted, said lug and journal serving as fulcra for the handle in tilting motions; a deadman valve in the path of said handle when so tilted, whereby the handle serves as an operating connection between said yielding means and said deadman valve; a cap enclosing said hub, slotted member and deadman valve, said cap having an aperture for the insertion and operative movements of said handle; and a guard carried by said slotted member and masking the aperture in said cap, said guard having a slot for the insertion and tilting movements of said handle.

20. The combination of a valve; a rotary hub for actuating said valve, said hub having an apertured eccentric lug to receive an actuating handle; a slotted member swiveled concentrically in said hub and shiftable axially therein, said slot being formed with at least one bearing notch and adjacent cam shoulder; yielding means urging said swiveled member axially relatively to said hub; a removable handle insertible through the slot in said member into the aperture in said lug, said handle having at least one journal which rides over said cam shoulder to seat in said bearing notch as the handle is inserted, said lug and journal serving as fulcra for the handle in tilting motions, and the portion of said handle which enters the aperture in said lug being formed to engage the lug and prevent withdrawal of the handle except at one limit of tilt of the handle;

and a deadman valve in the path of said handle when tilted by said yielding means.

21. The combination of a valve; a rotary hub for actuating said valve, said hub having an apertured eccentric lug to receive an actuating handle; a slotted member swiveled concentrically in said hub and shiftable axially therein, said slot being formed with at least one bearing notch and adjacent cam shoulder; yielding means urging said swiveled member axially relatively to said hub; a removable handle insertible through the slot in said member into the aperture in said lug, said handle having at least one journal which rides over said cam shoulder to seat in said bearing notch as the handle is inserted, said lug and journal serving as fulcra for the handle in tilting motions, and the portion of said handle which enters the aperture in said lug being formed to engage the lug and prevent withdrawal of the handle except at one limit of tilt of the handle; means preventing insertion and withdrawal of said handle except in one angular position of said hub; and a deadman valve in the path of said handle when tilted by said yielding means.

22. The combination of a brake valve; a normally inactive deadman valve; a motor for actuating said deadman valve; and a removable operating handle for the brake valve, said handle when operatively related to the brake valve, being in controlling relation with said motor and forming the operating connection between said motor and said deadman valve.

23. The combination of a brake valve; a normally inactive deadman valve; a member mounted to rotate and to shift axially; yielding means urging said mmeber in an axial direction; and a handle insertible through said member into actuating relation with the brake valve, said handle when inserted controlling the rotary and axial movements of said member and forming the operative connection between said member and deadman valve.

24. The combination of a brake valve; a normally inactive deadman valve; a member mounted to rotate and to shift axially; yielding means urging said member in an axial direction; and a handle insertible through said member into actuating relation with the brake valve, said handle when inserted controlling the rotary and axial movements of said member and forming the operative connection between said member and deadman valve, said handle being so formed, that it actuates said deadman valve independently of said motor as the handle is inserted and withdrawn.

25. The combination of a brake valve; a normally inactive deadman valve; a motor for actuating said deadman valve; a removable operating handle for the brake valve, said handle when operatively related to the brake valve, being in controlling relation with said motor and forming the operating connection between said motor and said deadman valve; and means preventing attachment and removal of said handle except in one position of the brake valve.

26. The combination of a brake valve; a normally inactive deadman valve; a member mounted to rotate and to shift axially; yielding means urging said member in an axial direction; a handle insertible through said member into actuating relation with the brake valve, said handle when inserted controlling the rotary and axial movements of said member and forming the operative connection between said member and deadman valve; and means preventing insertion and withdrawal of said handle except in one position of the brake valve.

27. The combination of a brake valve; a normally inactive deadman valve; a member mounted to rotate and to shift axially; yielding means urging said member in an axial direction; a handle insertible through said member into actuating relation with the brake valve, said handle when inserted controlling the rotary and axial movements of said member and forming the operative connection between said member and deadman valve, said handle being so formed, that it actuates said deadman valve independently of said motor as the handle is inserted and withdrawn; and means preventing insertion and withdrawal of said handle except in one position of the brake valve.

28. The combination of a rotary brake valve; a deadman valve reciprocable in a direction parallel with the axis of rotation of the brake valve; a member freely rotatable concentrically with the brake valve and shiftable axially; yielding means urging said member in an axial direction; and a removable handle engageable with said member to control the rotary and axial motions thereof, said handle affording a driving connection between said member and the brake valve and between said member and the deadman valve.

29. The combination of a rotary brake valve; a deadman valve reciprocable in a direction parallel with the axis of rotation of the brake valve; a member freely rotatable concentrically with the brake valve and shiftable axially; yielding means urging said member in an axial direction; a removable handle engageable with said member to control the rotary and axial motions thereof, said handle affording a driving connection between said member and the brake valve and between said member and the deadman valve; and enclosing means carried at least in part by said member.

CHARLES A. CAMPBELL.